Nov. 24, 1953  
W. H. CUTTINO  
2,660,694  
HOUSED CAPACITOR ASSEMBLY WITH  
INTERLOCKED GROUNDING SWITCH  
Filed Feb. 23, 1951  
3 Sheets-Sheet 1

WITNESSES:  
Robert C. Baird  
Nir Le Groome

INVENTOR  
William H. Cuttino.  
BY  
ATTORNEY

Nov. 24, 1953          W. H. CUTTINO          2,660,694
           HOUSED CAPACITOR ASSEMBLY WITH
              INTERLOCKED GROUNDING SWITCH
Filed Feb. 23, 1951                    3 Sheets-Sheet 2

WITNESSES:
Robert G Baird
Wm. Le Grosne

INVENTOR
William H. Cuttino.
BY
ATTORNEY

Nov. 24, 1953 — W. H. CUTTINO — 2,660,694
HOUSED CAPACITOR ASSEMBLY WITH
INTERLOCKED GROUNDING SWITCH
Filed Feb. 23, 1951 — 3 Sheets-Sheet 3

WITNESSES:
Robert C. Baird
Wm. L. Groome

INVENTOR
William H. Cuttino.
BY
ATTORNEY

Patented Nov. 24, 1953

2,660,694

UNITED STATES PATENT OFFICE 2,660,694

HOUSED CAPACITOR ASSEMBLY WITH INTERLOCKED GROUNDING SWITCH

William H. Cuttino, Wilkinsburg, Pa., assignor to Westinghouse Electric Corporation, East Pittsburgh, Pa., a corporation of Pennsylvania Application February 23, 1951, Serial No. 212,387

12 Claims. (Cl. 317—99)

The present invention relates to housed capacitor banks or assemblies and, more particularly, to a grounding switch and interlock means for such capacitor banks.

Capacitors are frequently connected to alternating-current distribution and transmission lines for the purpose of power factor correction, and such installations usually consist of a suitable number of individual capacitor units assembled in a housing and connected together in a bank. Such capacitor banks often comprise a relatively large number of capacitor units and are capable of storing a large amount of energy, so that when such a bank is disconnected from the line, with the capacitors charged, the amount of energy stored in the bank, and the voltage at the terminals of the bank, are high enough to be dangerous to life. For this reason, standard capacitor units have discharge resistors built into them which are capable of dissipating the stored energy and discharging the capacitor to a safe voltage, within one minute for capacitors of the lower voltage ratings, and within five minutes for capacitors of the higher voltage ratings. As an additional necessary, or at least desirable, precaution, it is standard practice to short-circuit and ground the capacitors, or the buses to which they are connected, before it is considered safe to touch them. After the capacitors have thus been discharged and grounded, they can safely be touched and handled for inspection or maintenance work.

The principal object of the present invention is to provide a housed capacitor bank which has a grounding switch for short-circuiting and grounding the capacitors, and interlock means for preventing access to the capacitors unless they are grounded.

Another object of the invention is to provide a housed capacitor bank having a grounding switch for short-circuiting and grounding the capacitors, together with interlock means to prevent access to the capacitors unless the switch is in the grounding position, and to prevent operation of the switch to remove the ground and short-circuit unless the doors of the housing are closed and locked.

A more specific object of the invention is to provide a relatively simple and inexpensive grounding switch and interlocking means for housed capacitor units which will prevent access to the capacitors unless the grounding switch is in position to short-circuit and ground them, and which will prevent operation of the grounding switch to remove the ground unless the doors of the housing are closed and locked.

Other objects and advantages of the invention will be apparent from the following detailed description, taken in connection with the accompanying drawings, in which.

Figure 1:
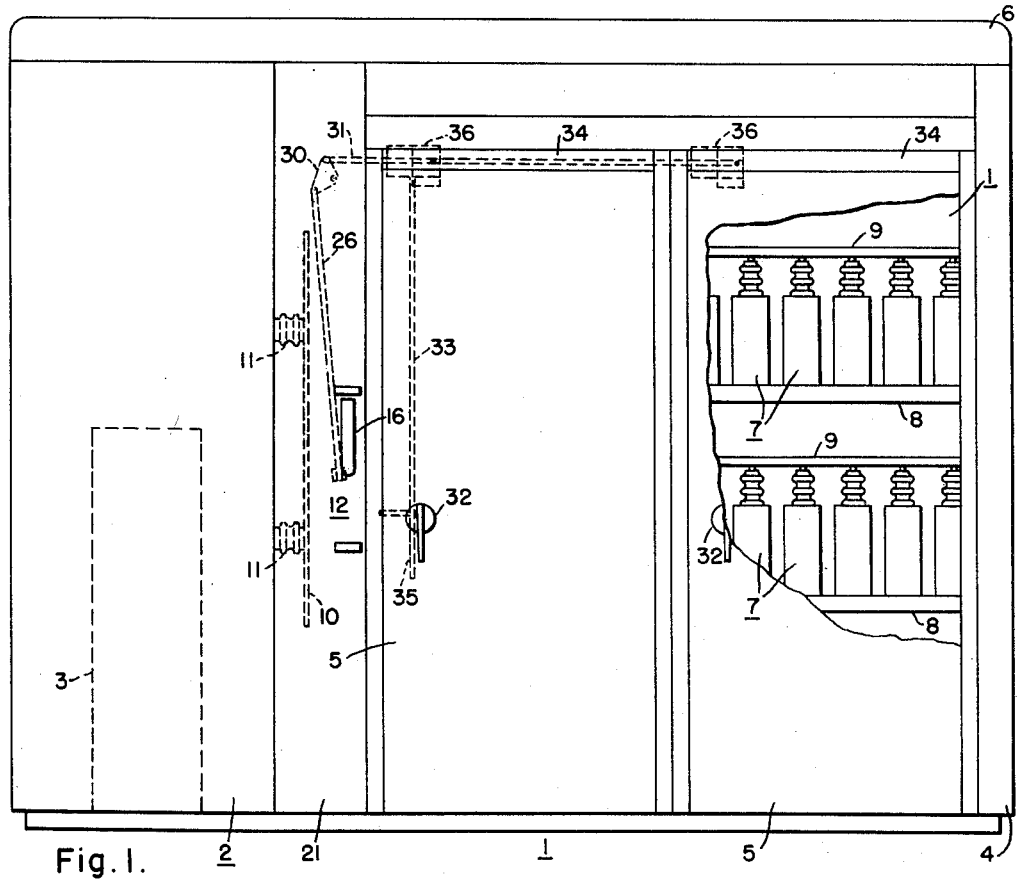
Figure 1 is a view in front elevation of a housed capacitor bank embodying the invention.

Fig. 1 of the drawings shows a capacitor bank contained in a housing which comprises two capacitor compartments 1 and a circuit-breaker compartment 2. The capacitor and circuit-breaker compartments may be of any suitable or usual construction, and are shown as consisting of a structural steel framework with suitable walls and doors to enclose the interior and to permit access to the equipment contained therein. The circuit-breaker compartment 2 houses a circuit-breaker 3 for the bank, and may also contain any other desired control or protective equipment. The capacitor compartments 1 are closed at the front and back by means of doors 5 and are open at the sides. Any desired number of capacitor compartments may be used, depending on the size of the bank, and they are placed side by side, as shown, adjoining the circuit-breaker compartment, the open end being closed by a cover plate 4. The top of the housing is closed by a roof member 6 of any suitable construction.

The individual capacitor units 7 which make up the bank are supported in tiers in the capacitor compartments 1 on longitudinally extending rails 8. The capacitors 7 are connected to buses 9 which extend longitudinally through all the capacitor compartments and are connected to vertical buses 10 which are supported on insulators 11 in a bus compartment 21 within the circuit-breaker compartment 2. It will be understood that any desired or usual arrangement of the capacitors and of the buses to which they are connected may be utilized.

Figure 2:
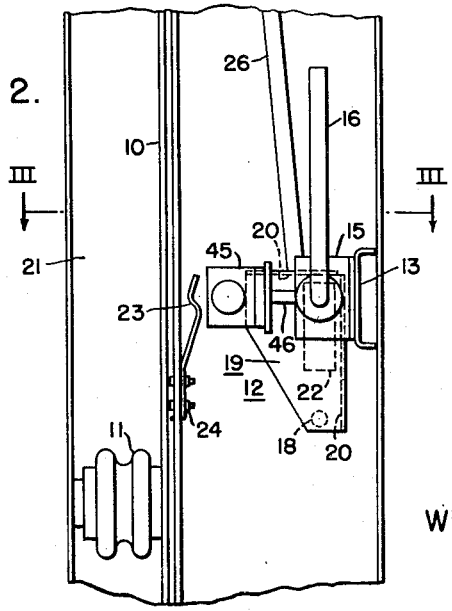
Fig. 2 is an enlarged view in front elevation of the grounding switch mechanism, with the front wall of the housing omitted.
Figure 3:
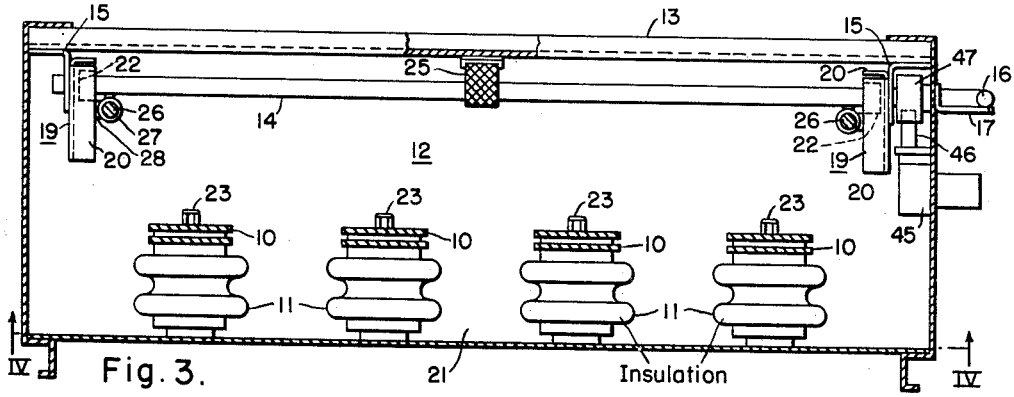
Fig. 3 is a top plan view of the grounding switch mechanism, approximately on the line III—III of Fig. 2.
Figure 4:
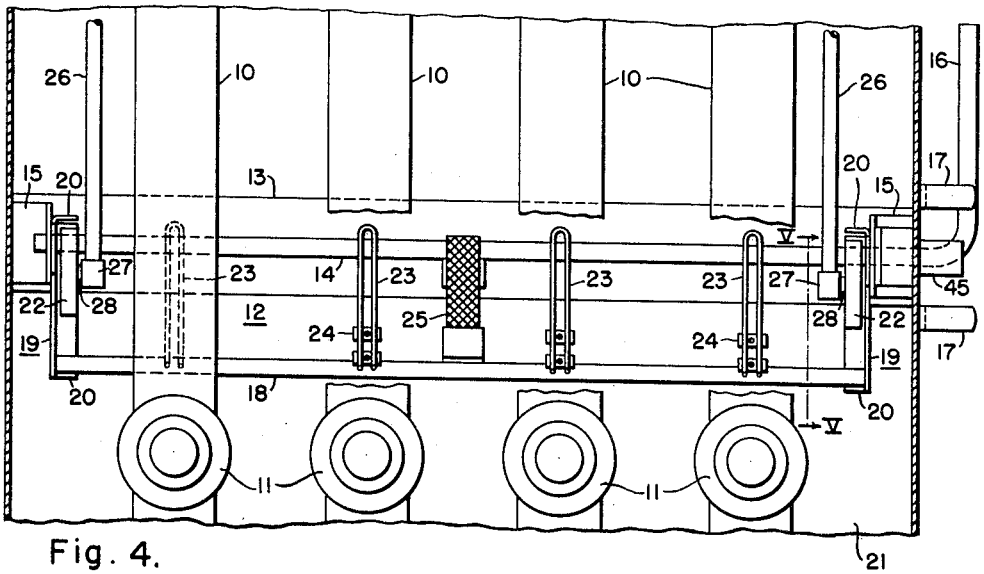
Fig. 4 is a side view of the grounding switch mechanism, approximately on the line IV—IV of Fig. 3.

As explained above, when the capacitor bank is disconnected from the line, and the capacitors 7 have been sufficiently discharged by their internal discharge resistors, it is necessary to short-circuit and ground the capacitors, before they can safely be touched. This is most conveniently done by short-circuiting and grounding the buses 10 to which the capacitors are connected, and for this purpose, a grounding switch, generally designated 12, is provided adjacent the buses 10 in the compartment 21. The grounding switch 12 is shown in detail in Figs. 2, 3 and 4, and is supported on a channel, or other structural member 13 which extends transversely of the bus compartment 21 and is welded to the front and back walls.

The switch 12 includes a shaft 14 which runs transversely through the housing and is supported for rotation in angle brackets 15 welded to the channel 13. The shaft 14 extends through the front wall of the housing and is bent at right angles to form a handle 16 for the switch. Suitable stops 17 may be welded to the front of the housing to limit the movement of the handle 16. The switch blade 18 may be a piece of steel rod or pipe which is secured at its ends to sheet metal brackets 19. The brackets 19 are generally triangular and are provided with flanges 20 on two sides at right angles to each other. The brackets 19 are supported on the shaft 14, which passes through openings in the brackets, so that the brackets and switch blade hang freely on the shaft in the open position of the switch shown in the drawings. Lever members 22 are secured to the shaft 14 at each end within the flanges of the brackets 19 in position to engage the flanges when the shaft 14 is rotated. Spring contacts 23 are secured to the vertical bus bars 10 in position to be engaged by the blade 18 of the switch 12 when it is moved to its grounding position. The contacts 23 may be of any suitable type and are mounted directly on the bus bars by means of cleats 24 or in any other suitable manner.

The switch 12 is shown in the drawings in its open position. When it is desired to move the switch to its closed or grounding position, the handle 16 is moved clockwise until it extends vertically downward. It will be seen that when the shaft 14 is thus rotated, the levers 22 will rotate into engagement with the flanges 20 at the top edges of the switch brackets 19 to move the brackets and carry the switch blade 18 into engagement with the contacts 23 to short-circuit them. A woven copper connector 25 is soldered or otherwise connected to the switch blade 18 and its other end is connected to the channel 13 to connect the switch blade directly to the housing, which is usually grounded. If the housing itself is not grounded, the connector 25 may be connected to any other suitable ground. Thus, when the switch 12 is in its closed position, the bus bars 10 are short-circuited and grounded. When the switch handle 16 is moved to open the switch, the levers 22 engage the other flanges on the brackets 19 and return them to the position shown in the drawings.

Figure 5:
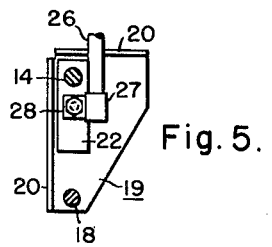
Fig. 5 is a fragmentary detail view on the line V—V of Fig. 4.

As previously indicated, the present invention provides interlock means actuated by the switch 12 for preventing access to the capacitors 7 or buses 9 and 10 when the switch is in its open position. For this purpose, vertical push rods 26 are connected to the switch mechanism at the front and back of the housing. As shown in Fig. 5, each of the push rods 26 is threaded into a coupling member 27 which is mounted on a pin 28 pivotally supported in the lever 22, so that when the handle 16 is moved to rotate the shaft 14 to close the switch, the push rods 26 will be moved vertically upward. The push rods 26 form part of a linkage connecting the switch 12 to interlock means associated with each of the doors 5, at both front and back of the housing. The upper end of each of the push rods 26 is connected to a crank plate 30 which is pivoted in the upper part of the bus compartment 21. A horizontal push rod 31 is pivotally connected to the other corner of the triangular crank plate 30, so that when the rod 26 is moved upward and the crank plate 30 moves about its pivot, the rod 31 is moved to the right, as viewed in Fig. 1. It will be understood that a similar crank plate and push rod are provided at the back of the housing to operate the interlocks associated with the doors on that side.

Figure 6:
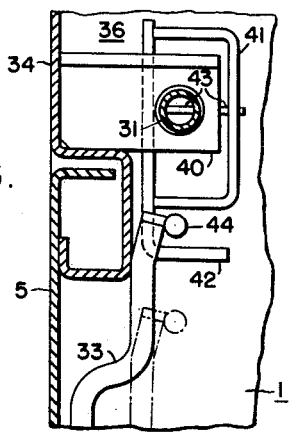
Fig. 6 is an end view of a door interlock, on the line VI—VI of Fig. 7.
Figure 7:
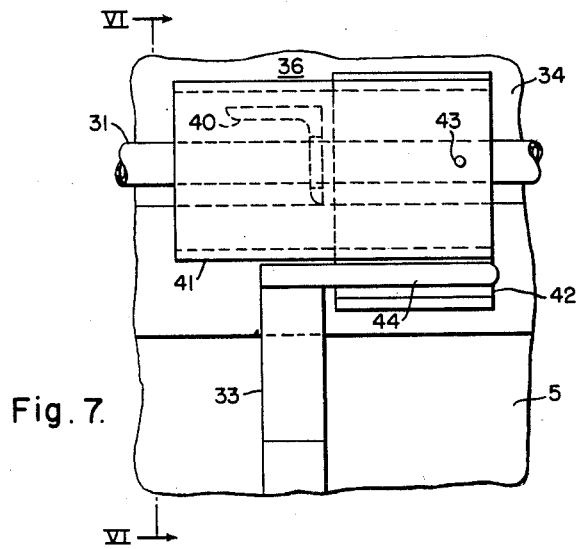
Figs. 7 and 8 are front views of the door interlock, showing the interlock in locked position and in unlocked position, respectively.
Figure 8:
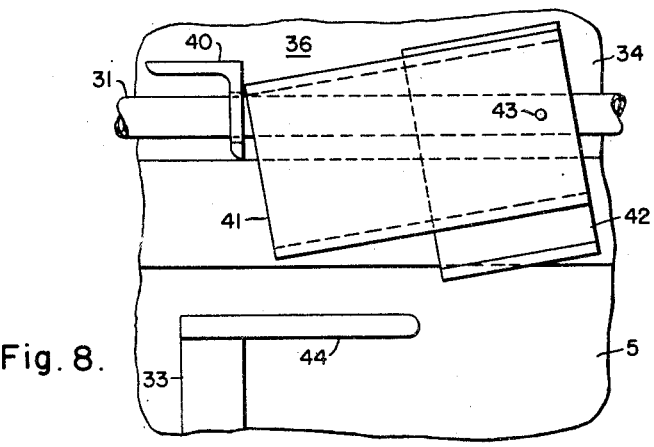

The door interlocks themselves are shown in detail in Figs. 6, 7 and 8. Each of the doors 5 has a handle 32 and a vertical latching rod 33 connected to the handle. The upper end of the latching rod 33 has an offset portion and when the door 5 is closed and latched, the upper end of the latching rod engages behind the top member 34 of the capacitor compartment 1 to latch the door in closed position. When the handle 32 is turned, the latching rod 33 is moved downward to release the door and allow it to be opened. If desired, a similar rod 35 may extend downward from the handle to latch the door at the bottom. The interlock 36 is supported in the capacitor compartment 1 above the door 5, as clearly shown in Figs. 1 and 6, and each door, at both front and back of the housing, is provided with an interlock 36, all of which are identical in construction. The push rods 31 extend continuously through the capacitor compartments 1 at both front and back and carry all the interlocks 36. An angle member 40 is welded to the top member 34 of each capacitor compartment immediately above the door 5, and the angle members 40 have openings in them through which the push rod 31 passes, so that it is supported by the angles 40 and is free to move back and forth.

The interlock 36 for each door consists of a channel member 41 and an angle member 42. The channel member 41 is substantially longer than the angle 42 and the angle 42 extends below the channel 41 at one end thereof. The two members are welded together in the position shown in the drawings, with the flange of the angle member extending inward away from the door 5. The interlocks for all the doors are identical and are arranged in the same relative positions with respect to the doors, the views of Figs. 7 and 8 showing the interlock for one of the rear doors of the housing, viewed from the inside. Each interlock 36 is carried on the push rod 31, which extends through the channel member 41, and the interlock is mounted on the rod 31 by means of a pin 43 near the end of the channel which extends through the rod and permits pivotal movement of the interlock. Each of the latching rods 33 of the doors 5 has a locking pin 44 welded to its upper end in position to be engaged by the flange of the angle 42 as shown in Fig. 7, so that when the interlock is in this position, the latching rod 33 cannot be moved and the door 5 is effectively locked.

When the capacitor bank is connected to the line, with the circuit breaker 3 closed, the grounding switch 12 is in its open position shown in the drawings, and is preferably locked in that position by means of a key interlock 45, which has a bolt 46 engaging in a hole in a drum 47 mounted on the shaft 14. With the doors 5 of the capacitor compartments closed and latched, and the switch 12 in open position, the interlocks 36 will be in the position shown in Fig. 7, the latching rods 33 being in the upper position shown in full lines in Fig. 6, with the locking pins 44 engaged by the angle members 42 of the interlocks, so that the doors are locked and cannot be opened, thus preventing access to the capacitors 7 when they are energized.

When the capacitor bank is removed from the line by tripping the circuit breaker 3, the capacitors must be short-circuited and grounded before the doors 5 are unlocked. To do this, the switch 12 must first be unlocked by operating the key interlock 45 to withdraw the bolt 46. Preferably, the key required to operate this interlock may also be used with a key interlock for the circuit breaker 3, so that the key cannot be obtained to operate the interlock 45 unless the breaker is first tripped. When the switch 12 is unlocked, the handle 16 can be operated to move the switch blade 18 to its closed or grounding position in engagement with the contacts 23 on the buses 19, thus short-circuiting and grounding the capacitor units 7. When the switch is moved to this position, the push rods 26 are moved vertically, causing the push rods 31 to be moved to the right, as viewed in the drawings. When so moved, the interlocks 36 carried on the push rods are moved to the right, to the position shown in Fig. 8, in which the locking pins 44 of the latching rods 33 are clear of the interlock. The handles 32 of the housing doors 5 may then be operated to unlatch the doors and open them to permit access to the capacitors.

When each latching rod 33 is moved down to the unlatched position, shown dotted in Fig. 6, the corresponding interlock 36 is free to pivot about the pin 43 and drops to the position shown in Fig. 8, in which the channel 41 rests directly against the push rod. It will be apparent that in this position the push rod 31 cannot move to the left because of engagement of the channel 41 with the fixed angle 40, and the handle 16 of the switch, therefore, cannot be operated to open the switch. Thus, as long as any one of the doors 5 is open, operation of the switch 12 is positively prevented, and the switch is locked in its grounding position. When it is desired to reconnect the capacitor bank to the line and restore it to service, all the doors 5 must first be closed and latched. When each door is latched by operation of its handle 32, the latching rod 33 is moved vertically upward, and the locking pin 44 engages the channel 41 and moves it up to a substantially horizontal position. When all of the doors 5 have thus been latched, the handle 16 can be operated to open the switch 12. This operation of the switch moves the push rods 26 vertically downward and thus moves the push rods 31 to the left, so that the angles 42 of the interlocks engage under the locking pins 44 of the doors 5, locking the latching rods 33 in the latched position so that the doors are again locked. The switch 16 may then be locked in open position by means of the key interlock 45, and if a similar interlock is utilized with the circuit breaker 3, the key can then be used to unlock the breaker and permit it to be reclosed to connect the capacitor bank to the line.

It should now be apparent that a relatively simple and inexpensive interlock means has been provided for housed capacitor banks which positively locks the doors of the housing when the grounding switch is open, so that access to the capacitors is prevented unless they are first short-circuited and grounded. The interlocking means also positively locks the grounding switch in grounding position as long as any one or more of the doors are open or unlatched, and prevents operation of the switch to remove the ground unless all the doors are closed and latched.

A particular embodiment of the invention has been shown and described for the purpose of illustration but it will be apparent that other embodiments and modifications are possible within the scope of the invention, and it is to be understood that the invention is not limited to the specific details of construction shown but in its broadest aspects it includes all equivalent embodiments and modifications which come within the scope of the appended claims.

I claim as my invention:

1. A housed capacitor assembly comprising a housing, a plurality of capacitors disposed in the housing and electrically connected together, said housing having doors to permit access to the capacitors, switch means in the housing for grounding the capacitors, said switch means having an open position and a grounding position, and locking means for said doors directly actuated by operation of the switch means, said locking means being adapted to lock the doors in closed position when the switch means is in open position and to release the doors when the switch means is in grounding position.

2. A housed capacitor assembly comprising a housing, a plurality of capacitors disposed in the housing and electrically connected together, said housing having doors to permit access to the capacitors, switch means in the housing for grounding the capacitors, said switch means having an open position and a grounding position, and locking means for said doors directly actuated by operation of the switch means, said locking means being adapted to lock the doors in closed position when the switch means is in open position and to release the doors when the switch means is in grounding position, and said locking means including means for preventing operation of the switch means when the doors are unlocked.

3. A housed capacitor assembly comprising a housing, a plurality of capacitors disposed in the housing and electrically connected together, said housing having doors to permit access to the capacitors, latching means for said doors, switch means in the housing for grounding the capacitors, said switch means having an open position and a grounding position, and locking means directly actuated by operation of the switch means for locking said latching means in latched position when the switch means is in open position.

4. A housed capacitor assembly comprising a housing, a plurality of capacitors disposed in the housing and electrically connected together, said housing having doors to permit access to the capacitors, latching means for said doors, switch means in the housing for grounding the capacitors, said switch means having an open position and a grounding position, and locking means directly actuated by operation of the switch means for locking said latching means in latched position when the switch means is in open position, said locking means being adapted to release the latching means when the switch means is in grounding position and to prevent operation of the switch means when the doors are unlatched.

5. A housed capacitor assembly comprising a housing, a plurality of capacitors disposed in the housing, the housing having doors to permit access to the capacitors, bus conductors, in the housing, means for electrically connecting the capacitors to the buses, a grounding switch for grounding the buses, said switch having an open position and a grounding position, locking means for said doors, and means directly actuated by operation of the grounding switch for effecting locking of the doors when the switch is in open position and for releasing the doors when the switch is operated to grounded position.

6. A housed capacitor assembly comprising a housing, a plurality of capacitors disposed in the housing, the housing having doors to permit access to the capacitors, bus conductors in the housing, means for electrically connecting the capacitors to the buses, a grounding switch for grounding the buses, said switch having an open position and a grounding position, latching means for said doors, and means directly actuated by operation of the grounding switch for locking the latching means in latched position when the switch is in open position and for releasing the latching means when the switch is operated to grounding position.

7. A housed capacitor assembly comprising a housing, a plurality of capacitors disposed in the housing, the housing having doors to permit access to the capacitors, bus conductors in the housing, means for electrically connecting the capacitors to the buses, a grounding switch for grounding the buses, said switch having an open position and a grounding position, latching means for said doors, and means directly actuated by operation of the grounding switch for locking the latching means in latched position when the switch is in open position and for releasing the latching means when the switch is operated to grounding position, said locking means including means for preventing operation of the grounding switch when the doors are unlatched.

8. A housed capacitor assembly comprising a housing, a plurality of capacitors disposed in the housing, the housing having doors to permit access to the capacitors, bus conductors in the housing, means for electrically connecting the capacitors to the buses, a grounding switch for grounding the buses, said grounding switch having an open position and a grounding position, locking means adjacent each of said doors, a linkage connecting the grounding switch to each of the locking means for actuating the locking means when the switch is operated, the locking means being adapted to lock the doors when the switch is operated to open position and to release the doors when the switch is operated to grounding position.

9. A housed capacitor assembly comprising a housing, a plurality of capacitors disposed in the housing, the housing having doors to permit access to the capacitors, bus conductors in the housing, means for electrically connecting the capacitors to the buses, a grounding switch for grounding the buses, said grounding switch having an open position and a grounding position, latching means for each of said doors, locking means adjacent the latching means of each door, a linkage connecting the grounding switch to each of said locking means for actuating the locking means when the switch is operated, the locking means being adapted to engage the latching means of each door to lock the door when the switch is operated to open position and to release the latching means when the switch is operated to grounding position, the locking means also being adapted to prevent operation of the switch when any of the doors are unlatched.

10. A housed capacitor assembly comprising a housing, a plurality of capacitors disposed in the housing, the housing having doors to permit access to the capacitors, bus conductors in the housing, means for electrically connecting the capacitors to the buses, a grounding switch for grounding the buses, said grounding switch having an open position and a grounding position, latching means for each of said doors, a movable rod extending through the housing adjacent said latching means, a locking device carried on said rod adjacent each latching means, said locking devices being adapted to engage the latching means to lock them in latched position in one position of the movable rod and to release the latching means when the rod is moved to another position, and means connecting the movable rod to the grounding switch to move the rod to the first-mentioned position when the switch is moved to its open position and to move the rod to the last-mentioned position when the switch is moved to its grounding position.

11. A housed capacitor assembly comprising a housing, a plurality of capacitors disposed in the housing, the housing having doors to permit access to the capacitors, bus conductors in the housing, means for electrically connecting the capacitors to the buses, a grounding switch for grounding the buses, said grounding switch having an open position and a grounding position, latching means for each of said doors, a movable rod extending through the housing adjacent said latching means, a locking device pivotally supported on said rod adjacent each latching means, each locking device being adapted to engage the adjacent latching means to lock it in latched position when the movable rod is in one position and to release the latching means when the rod is moved to another position, the locking device being adapted to move about its pivot into engagement with a fixed abutment to prevent movement of the rod when the latching means is moved to unlatched position, and means connecting the movable rod to the grounding switch to move the rod to the first-mentioned position when the switch is moved to its open position and to move the rod to the last-mentioned position when the switch is moved to its grounding position.

12. A housed capacitor assembly comprising a housing, a plurality of capacitors disposed in the housing, the housing having doors to permit access to the capacitors, bus conductors in the housing, means for electrically connecting the capacitors to the buses, a grounding switch for grounding the buses, said grounding switch having an open position and a grounding position, latching means for each of said doors, a movable rod extending through the housing adjacent said latching means, a locking device pivotally supported on said rod adjacent each latching means, each of said locking devices having a portion adapted to be engaged by the adjacent latching means when the latching means is in latched position to hold the locking means against movement about its pivot and each locking device having a portion adapted to engage the adjacent latching means to lock it in latched position when the movable rod is in one position, the locking means being adapted to release the latching means when the rod is moved to another position and to move about its pivot into engagement with a fixed abutment to prevent movement of the rod when the latching means is moved to unlatched position, and means connecting the movable rod to the grounding switch to move the rod to the first-mentioned position when the switch is moved to its open position and to move the rod to the last-mentioned position when the switch is moved to its grounding position.

WILLIAM H. CUTTINO.

References Cited in the file of this patent

UNITED STATES PATENTS

| Number | Name | Date |
| --- | --- | --- |
| 1,725,441 | Caldwell | Aug. 20, 1929 |
| 1,760,571 | Wadsworth | May 27, 1930 |
| 1,832,444 | Berger | Nov. 17, 1931 |
| 2,070,315 | Rawlins et al. | Feb. 9, 1937 |
| 2,158,868 | Stacy | May 16, 1939 |
| 2,283,727 | Gage | May 19, 1942 |
| 2,363,364 | Rugg | Nov. 21, 1944 |

FOREIGN PATENTS

| Number | Country | Date |
| --- | --- | --- |
| 565,885 | Great Britain | Dec. 1, 1944 |